United States Patent
Ueno et al.

(10) Patent No.: US 7,281,855 B2
(45) Date of Patent: Oct. 16, 2007

(54) TAPERED ROLLER BEARING AND FINAL REDUCTION GEAR

(75) Inventors: Hiroshi Ueno, Tondabayashi (JP);
Kazutoshi Toda, Tondabayashi (JP);
Hirofumi Dodoro, Kashihara (JP);
Shigeo Kamamoto, Kashiwara (JP);
Hiroki Matsuyama, Nara (JP); Liming Lou, Yamatokooriyama (JP); Michiru Ueda, Kashiba (JP); Kiyoshi Ogino, Kashihara (JP); Tomohiro Haruta, Kashiwara (JP); Shinya Matsuda, Kashiba (JP); Naoto Araki, Yao (JP);
Koshiro Yamakawa, Kashiwara (JP);
Kazuhisa Kajihara, Yao (JP); Yoshio Tateishi, Yamatotakada (JP)

(73) Assignee: Koyo Seiko Co., Ltd., Osaka-shi, Osaka (JP)

( * ) Notice: Subject to any disclaimer, the term of this patent is extended or adjusted under 35 U.S.C. 154(b) by 65 days.

(21) Appl. No.: 10/830,428

(22) Filed: Apr. 23, 2004

(65) Prior Publication Data
US 2005/0069238 A1   Mar. 31, 2005

(30) Foreign Application Priority Data
Apr. 25, 2003 (JP) .............................. 2003-121472
Jun. 9, 2003 (JP) .............................. 2003-163361
Jun. 9, 2003 (JP) .............................. 2003-163374

(51) Int. Cl.
*F16C 33/36* (2006.01)
(52) U.S. Cl. ................................................ 384/571
(58) Field of Classification Search .............. 384/571, 384/568, 564, 565, 548
See application file for complete search history.

(56) References Cited

U.S. PATENT DOCUMENTS

| 2,130,379 | A |  | 9/1938 | Chilton |
| 3,951,483 | A | * | 4/1976 | Nakamura ................... 384/565 |
| 4,065,191 | A |  | 12/1977 | Kellstrom |
| 6,086,261 | A |  | 7/2000 | Nakagawa et al. |
| 6,379,049 | B1 | * | 4/2002 | Shibazaki et al. .......... 384/450 |
| 6,502,996 | B2 | * | 1/2003 | Joki ........................... 384/571 |
| 6,513,985 | B2 | * | 2/2003 | Unno et al. ................. 384/568 |
| 6,623,168 | B2 | * | 9/2003 | Matsuyama et al. ........ 384/568 |
| 6,883,236 | B2 | * | 4/2005 | Toda et al. .................. 384/571 |
| 2002/0064327 | A1 |  | 5/2002 | Toda et al. |

FOREIGN PATENT DOCUMENTS

DE 2 257 155 5/1974
DE 44 40 260 A1 5/1996

(Continued)

OTHER PUBLICATIONS

European Search Report dated Oct. 19, 2005.

*Primary Examiner*—Thomas R. Hannon
(74) *Attorney, Agent, or Firm*—McGinn IP Law Group, PLLC

(57) ABSTRACT

A tapered roller bearing includes: an outer race including an outer raceway surface; an inner race including an inner raceway surface and a larger collar surface which is a concave curved surface; and tapered rollers provided between the outer and inner races, each of the tapered rollers including a tapered surface and a larger end surface which is a convex curved surface communicating with the tapered surface and corresponds to the larger collar surface.

12 Claims, 6 Drawing Sheets

FOREIGN PATENT DOCUMENTS

| | | |
|---|---|---|
| DE | 197 01 086 A 1 | 7/1998 |
| JP | 59-118818 | 8/1984 |
| JP | 61-139310 | 8/1986 |
| JP | 11-270553 | 10/1999 |
| JP | 2000-161466 | 6/2000 |
| JP | 2000-193069 | 7/2000 |
| JP | 2002-98137 | 4/2002 |

* cited by examiner

TAPERED ROLLER BEARING AND FINAL REDUCTION GEAR

BACKGROUND OF THE INVENTION

This invention relates to a tapered roller bearing, and more particularly to a tapered roller bearing in which a torque loss is reduced and further relates to a final reduction gear adapted to transmit driving torque from a driving power source, such as an engine to an axle, and more particularly to a final reduction gear in which a roller bearing has been improved.

A tapered roller bearing having an outer race, an inner race and a plurality of tapered rollers arranged between these races is compact, and capable of supporting a large radial load and an axial load and, moreover, being used at a high rotational speed. However, as compared with a ball bearing, a torque loss in slide contact portions of a larger end surface of the tapered roller and a larger collar (rib) surface of the inner race both of which exert an axial load on each other is large. Therefore, the reduction of torque becomes a problem from the viewpoint of the saving of energy.

As a tapered roller bearing 21 in which a torque loss due to the slide contact of the tapered roller with the inner raceway is reduced, such a tapered roller bearing has been proposed that includes an outer race 22, an inner race 23 and a tapered roller 24 as shown in FIGS. 8A and 8B, in which a larger end surface 25 of the tapered roller 24 is formed frusto-conically with a larger collar surface 26 of the inner race 23 formed as an inclined surface opposed to the larger end surface 25, (Patent Document 1).

Patent Document 1
   JP-A-61-139310U

In the tapered roller bearing 21 disclosed in the Patent Document 1, the surface of the inner race 23 other than the surface portion thereof corresponding to an annular groove 27 provided therein contacts the tapered roller linearly so that the inner race has stress distribution shown by hatches of broken lines in FIG. 8A. When an axial load is exerted on the tapered roller, the tapered roller 24 is moved as shown in FIG. 8B toward a right upper portion of the drawing so as to run on the larger collar surface 26 of the inner race 23, and the inner race comes to have stress distribution shown by hatches of broken lines in the same drawing. Namely, in two portions, i.e. a portion between a smaller end surface-side end portion 24a of the tapered roller 24 and a smaller collar end portion 23a of a raceway surface of the inner race 23, and a portion between a body side end portion of the larger end surface 25 of the roller and the larger collar surface 26 of the inner race 23, specially large power comes to be exerted (occurrence of an edge load) on each other, so that an early seizure and the separation of the roller come to occur in the bearing 21. As a result, the function of the bearing is not displayed sufficiently. Moreover, the regulation of a pre-load and a clearance is difficult.

As a differential gear unit for a final reduction gear, a differential gear unit is used which is provided with a pinion shaft supported rotatably on a differential carrier and mounted at one end portion thereof with a pinion gear, a ring gear meshed with the pinion gear, a differential case fixed to the ring gear, and a pair of roller bearings supporting the differential case rotatably on the differential carrier.

The roller bearings in the differential gear unit have heretofore been made of tapered roller bearings so as to obtain a high rigidity thereof but the reduction of the torque of the bearings has become a problem from the viewpoint of improving the fuel consumption. Under the circumstances, using ball bearings the rotary torque of which is smaller than that of the tapered roller bearings has been proposed. (Refer to Patent Document 2.)

The Patent Document 2 discloses a final gear unit as well which is provided with a pinion shaft mounted at one end portion thereof with a pinion gear and adapted to receive driving torque transmitted from an engine thereto, and a pair of tapered roller bearings supporting the pinion shaft rotatably on the differential carrier. The related art tapered roller bearings are used as they are as the tapered roller bearings in this final gear unit.

Patent Document 2
   JP-A-2000-161466

In a differential gear unit using ball bearings, the rigidity thereof usually lowers as compared with a differential gear unit using tapered roller bearings. Therefore, new problems arise which include an increase in the manufacturing cost occurring due to a change in materials and the like made so that low torque loss and a high rigidity of the differential gear unit stand together, and a fear of a decrease in the lifetime of the differential gear unit which will be caused by the use of the gear unit in an extraneous oil. The development of a differential gear unit solving these new problems and having bearings securing the low torque loss and high rigidity mentioned above is demanded. The final gear unit also has a problem of reducing the torque loss of the tapered roller bearings for the same reasons mentioned above.

SUMMARY OF THE INVENTION

An object of the present invention is to provide, a tapered roller bearing capable of solving these problems, preventing the early seizure and separation thereof, and reducing a torque loss.

Another object of the present invention is to provide a final reduction gear which enables the fuel consumption to be improved by using highly rigid tapered roller bearings, and which has made improvements concerning a decrease in the lifetime and an increase in the manufacturing cost thereof.

In order to solve the aforesaid object, the invention is characterized by having the following arrangement.

(1) A tapered roller bearing comprising:
   an outer race including an outer raceway surface;
   an inner race including an inner raceway surface and a larger collar surface which is a concave curved surface; and
   tapered rollers provided between the outer and inner races, each of the tapered rollers including a tapered surface and a larger end surface which is a convex curved surface communicating with the tapered surface and corresponds to the larger collar surface.

(2) The tapered roller bearing according to (1), wherein
   an imaginary line is defined so that apexes of a imaginary conical shapes which are line symmetrical with respect to a rotating axis of the inner race gather in one point on the rotating axis, and the imaginary line passes the one point and an oblique side, closer to the rotating axis, of the imaginal conical shape, and
   a contact line of the tapered roller and the inner raceway surface crosses the imaginal line and is positioned at a smaller end side of the tapered roller on a radially outer side of the imaginary line and at a larger end side of the tapered roller on a radially inner side of the imaginary line.

(3) The tapered roller bearing according to (1), wherein the convex curved surface includes a spherical surface.

(4) The tapered roller bearing according to (1), wherein the larger collar (rib) surface is connected to the inner raceway surface.

(5) The tapered roller bearing according to (1), wherein a recess is formed in a boundary portion between the larger collar (rib) surface and the inner raceway surface.

(6) A final reduction gear comprising:

a final gear unit for transmitting a driving torque from an engine including a pinion shaft, one end of which is provided with a pinion gear, and a pair of roller bearings supporting the pinion shaft rotatably on a differential carrier; and a differential gear unit including a ring gear meshed with the pinion gear, a differential case provided to the ring gear and a pair of roller bearings rotatably supporting the differential case, wherein at least one of the roller bearings includes:

an outer race including an outer raceway surface;

an inner race including an inner raceway surface and a larger collar surface which is a concave curved surface; and tapered rollers provided between the outer and inner races, each of the tapered rollers including a tapered surface and a larger end surface which is a convex curved surface communicating with the tapered surface and corresponds to the larger collar rib surface.

(7) The tapered roller bearing according to (6), wherein an imaginary line is defined so that apexes of a imaginary conical shapes which are line symmetrical with respect to a rotating axis of the inner race gather in one point on the rotating axis, and the imaginary line passes the one point and an oblique side, closer to the rotating axis, of the imaginal conical shape, and a contact line of the tapered roller and the inner raceway surface crosses the imaginal line and is positioned at a smaller end side of the tapered roller on a radially outer side of the imaginary line and at a larger end side of the tapered roller on a radially inner side of the imaginary line.

(8) The tapered roller bearing according to (6), wherein the convex curved surface includes a spherical surface.

(9) The tapered roller bearing according to (6), wherein the larger collar rib surface is connected to the inner raceway surface.

(10) The tapered roller bearing according to (6), wherein a recess is formed in a boundary portion between the larger collar rib surface and the inner raceway surface.

DETAILED DESCRIPTION OF PREFERRED EMBODIMENTS

The modes of embodiments of the present invention will now be described with reference to the drawings. In the following description, the expression "left and right" shall mean the left and right sides of the drawings.

First Embodiment

Figure 1:
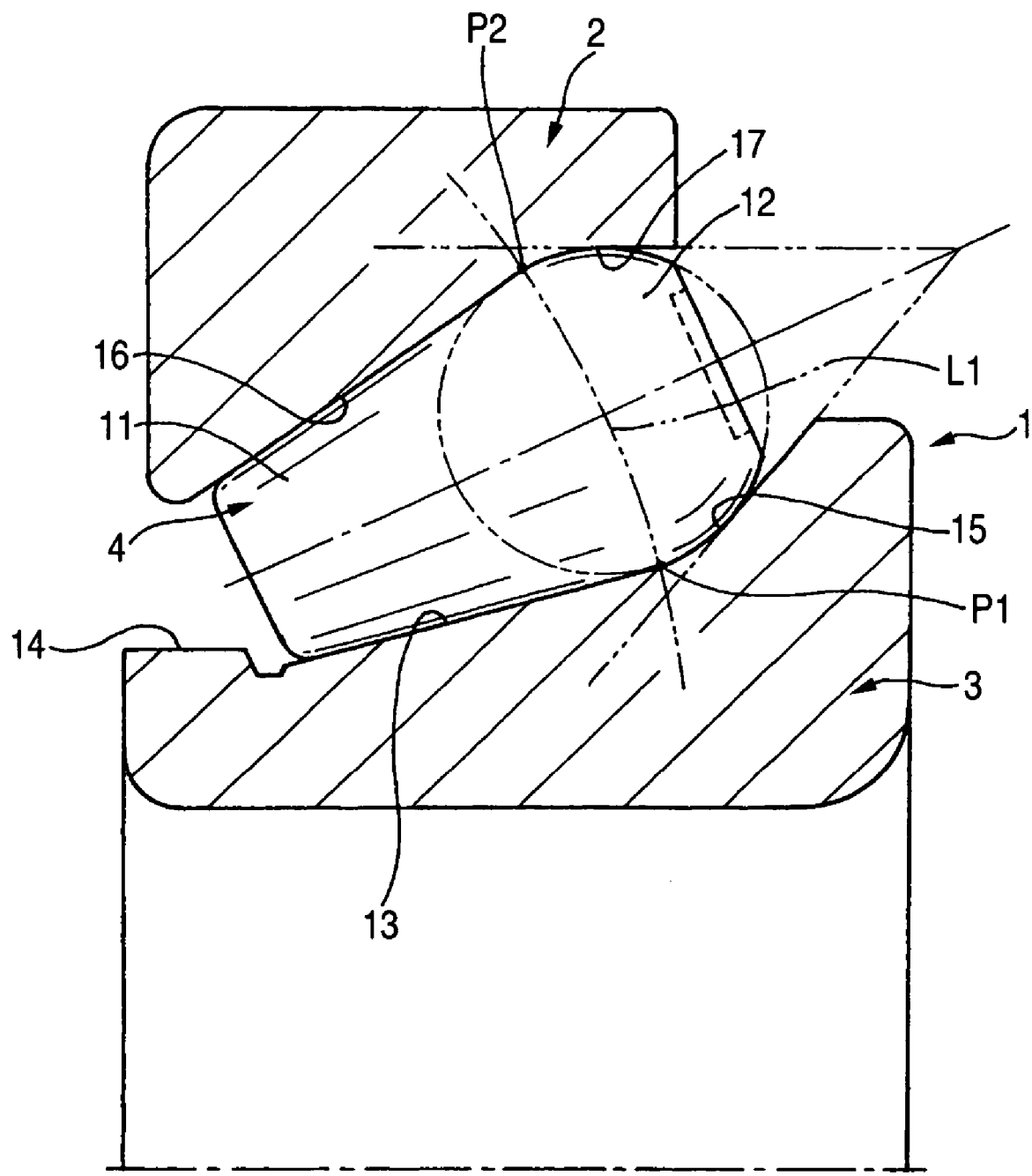
FIG. 1 is a longitudinal sectional view of an upper half portion of the tapered roller bearing according to a first embodiment of the present invention.

A tapered roller bearing 1 according to the present invention shown in FIG. 1 includes an outer race 2, an inner race 3, and a plurality of tapered rollers 4 arranged between these races.

Each tapered roller 4 includes a tapered body 11, and a larger end surface 12 provided at a right end portion thereof. The larger end surface 12 of the tapered roller 4 is formed as a convex curved surface connected to the tapered surface of the body 11 at an intersection of the larger end surface 12 and a curve L1 shown by a two-dot chain line. In the first embodiment, this curved surface is formed convexly.

The inner race 3 includes a tapered raceway surface 13, a smaller collar surface 14 provided at a left end portion of the raceway surface 13, and a larger collar rib surface 15 provided at a right end portion of the raceway surface 13. The larger collar rib surface 15 is formed as a concave curved surface opposed to the convex curved surface region of the larger end surface 12 of the tapered roller 4. In the first embodiment, the cross-sectional shape of the larger collar rib surface 15 is concave, and this concave curved surface communicates with the raceway surface 13 at a point P1.

The outer race 2 includes a tapered raceway surface 16, and a shoulder portion 17 provided at a right end portion of the raceway surface. In the first embodiment, the cross-sectional shape of an inner circumference of the shoulder portion 17 is concave, and this concave inner circumference communicates with the raceway surface 16 at a point P2.

Figure 2:
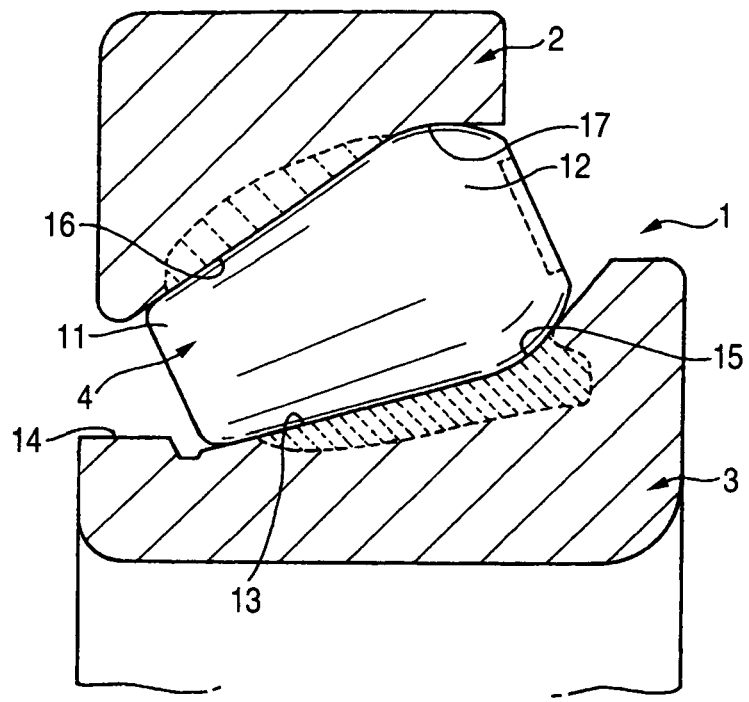
FIG. 2 is a drawing showing the stress distribution of the tapered roller bearing according to the present invention.

According to the tapered roller bearing 1 formed in the above-mentioned manner, the outer race 2 and the inner race 3 are in linear contact with the tapered roller 4 so that these parts have stress distribution shown by hatches of broken lines in FIG. 2. When an axial load is then imparted to the bearing in this condition, the convex larger end surface 12 of the tapered roller contacts the inner race larger collar rib surface 15 having a concave surface opposed thereto in a state that the inner race larger collar rib surface 15 embraces the convex larger end surface 12. Therefore, the axial position of the tapered roller 4 becomes stable, and the tapered roller is not substantially moved axially with respect to the raceway surface 13 of the inner race Accordingly, the same stress distribution is maintained. Thus, a load is supported owing to the rolling of the roller based on the continuous stress distribution, and the occurrence of an edge load can thereby be prevented. The contact of the convex surface and concave surface with each other is not a sliding contact but a rolling contact in which a sliding component is reduced, so that the tapered roller bearing 1 in which a torque loss is reduced greatly can be obtained.

Second Embodiment

Figure 3:
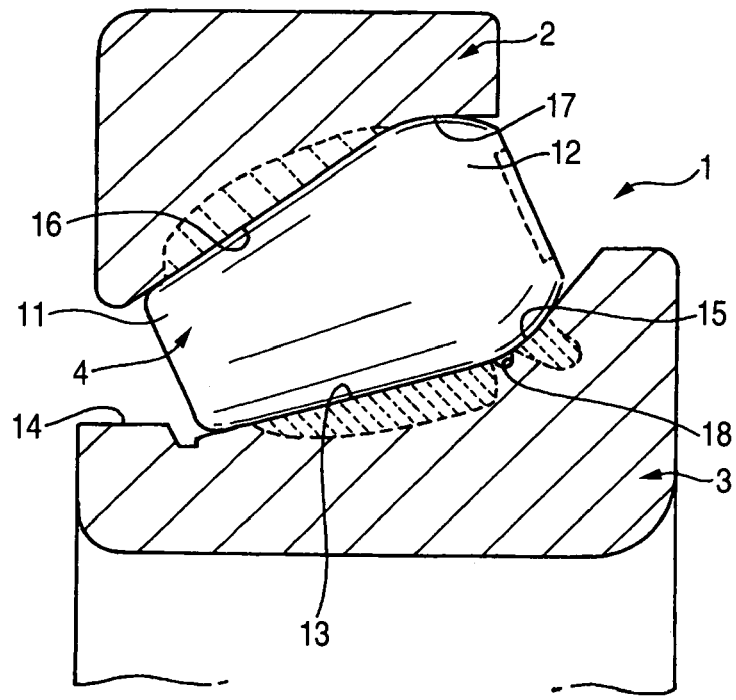
FIG. 3 is a drawing corresponding to FIG. 2 and showing the tapered roller bearing according to the second embodiment of the present invention.

FIG. 3 shows the tapered roller bearing 1 according to a second embodiment of the present invention. In an inner race 3, an annular groove (recess) 18 for preventing the interference of the parts with each other during the manufacturing thereof is formed between the tapered raceway surface 13 and a concave larger end surface 15. The construction of the other portions of the bearing is identical with that of the corresponding portions of the first embodiment shown in FIG. 1. Therefore, the same reference numerals will be added to such portions, and the description thereof will be omitted.

According to the tapered roller bearing 1 shown in FIG. 3, the outer race 2 and the inner race 3 are in linear contact with the tapered roller 4 so that these parts have stress distribution shown by hatches of broken lines in the same drawing. Owing to the annular groove 18 formed in the inner race 3, the stress in the mentioned portion thereof becomes zero but the general stress distribution is substantially identical with that shown in FIG. 2. When an axial load is further imparted to the bearing in this condition, a convex larger end surface 12 of the tapered roller 4 contacts the inner race larger collar rib surface 15, which has a concave surface opposed thereto, in the embraced state in the same manner as in the first embodiment. Therefore, the axial position of the tapered roller 4 becomes stable, and the tapered roller is not substantially moved axially with respect to the inner raceway surface 13. Accordingly, the same stress distribution is maintained. Thus, the occurrence of an edge load can be prevented, and the tapered roller bearing 1 in which a torque loss is reduced greatly can be obtained. The annular groove 18 formed in the inner race 3 can be used as a reservoir for lubricating oil. Thus, the tapered roller bearing 1 having an excellent lubricating ability in addition to an ability of reducing a torque loss by supporting a load on the roller rolling on the basis of the continuous stress distribution can be obtained.

Although an illustration is omitted, the tapered roller bearing 1 may, of course, have a retainer for retaining the tapered roller 4 thereon.

Third Embodiment

Figure 4:
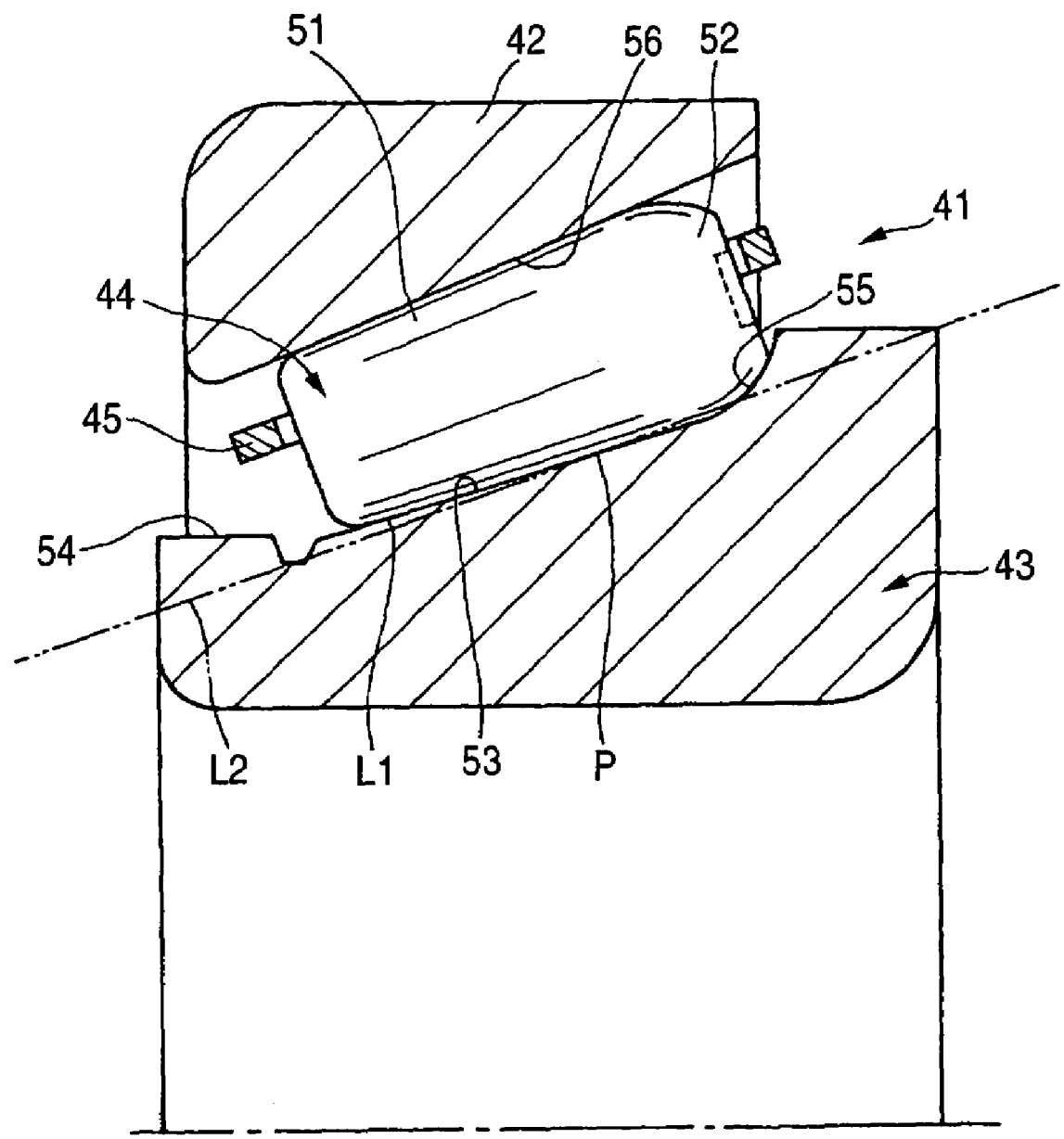
FIG. 4 is an upper half longitudinal sectional view showing the tapered roller bearing according to a third embodiment of the present invention.

A tapered roller bearing 41 according to a third embodiment shown in FIG. 4 includes an outer race 42, an inner race 43, a plurality of tapered rollers 44 arranged between these races, and a retainer 45 for retaining the tapered roller 44.

The tapered roller 44 includes a tapered body 51, and a larger end surface 52 provided on a right end portion thereof. The larger end surface 52 of the tapered roller 44 is formed by a convex curved surface continuing to a tapered surface of the body 51. In the third embodiment, this curved surface is a convex spherical surface.

The inner race 43 includes a tapered raceway surface 53, a smaller collar surface 54 provided at a left end portion of the raceway surface 53, and a larger collar rib surface 55 provided at a right end portion of the raceway surface 53. The larger collar rib surface 55 is formed to a concave curved surface opposed to the convex curved surface out of the larger end surface 52 of the tapered roller 44. In the third embodiment, the larger collar rib surface 55 is formed into a concavely arcuate surface in cross section and continues to the raceway surface 53.

The outer race 42 includes a tapered raceway surface 56. In the third embodiment, the portion of a raceway which is opposed to the convex surface of the larger end surface 52 of the tapered roller 44 is also formed to a tapered shape.

In the first embodiment, the tapered roller bearing is designed so that the apexes of conical shapes of the tapered rollers gather in one point (cone center) on the axis of the bearing.

On the other hand, in the third embodiment, assuming that a cone center line L2 shown by a two-dot chain lines in FIG. 4 is a line which passes the cone center and coincides with a contact line of the tapered roller 4 and the raceway surface 13 of the first embodiment, the contact line L1 of the tapered roller 44 and the inner raceway surface 53 of the second embodiment crosses the line L2 at a point P, and is positioned at the smaller end side of the roller on the radially outer side of the cone center line and at the larger end side thereof on the radially inner side of the same line.

Figure 5:
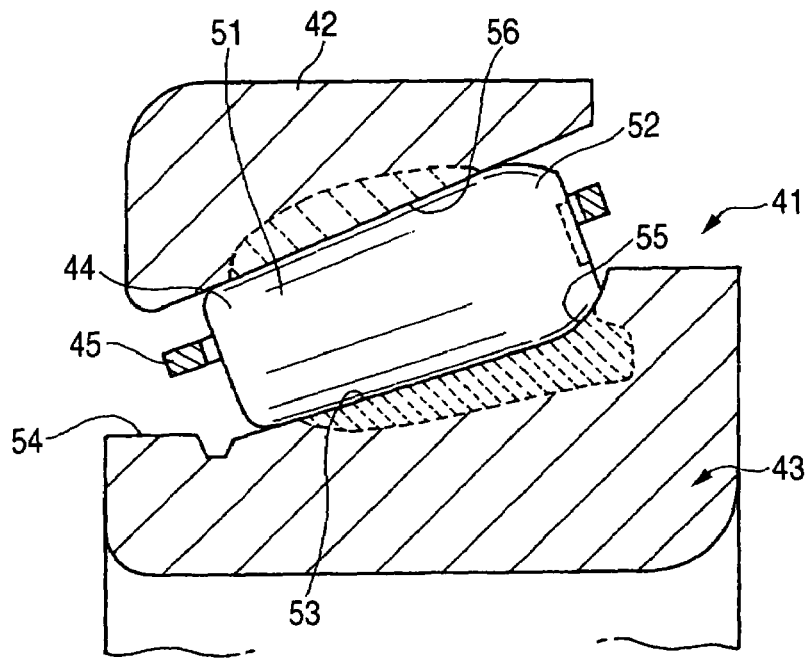
FIG. 5 is a drawing showing the stress distribution in the tapered roller bearing according to the present invention.

According to the tapered roller bearing 41 formed as described above, the outer race 42 and the inner race 43 are in linear contact with the tapered roller 44 so as to have the stress concentration shown by hatches of broken lines in FIG. 5. When an axial load is then imparted to the bearing in this condition, the convex larger end surface 52 of the tapered roller 44 contacts the larger collar rib surface 55, which is a concave curved surface opposed to the convex larger end surface, of the inner race in the embraced state with respect thereto. Therefore, the axial position of the tapered roller 44 becomes stable, and the tapered roller substantially does not move axially with respect to the inner raceway surface 53. As a result, the same stress distribution is maintained. Thus, the load is supported owing to the rolling of the roller based on the continuous stress distribution, and this enables the occurrence of an edge load to be prevented. Moreover, on the contact regions of the convex surface and concave surface, the roller is not in a sliding contacting state but in a rolling and sliding contacting state in which a sliding component is reduced greatly. Therefore, the tapered roller bearing 41 in which a torque loss is reduced greatly can be obtained.

Since the curved larger end surface 52 comes into rolling and sliding contact with the inner race in a position deviating radially outward from the cone center line L2, the speed of rotation of the roller on its own axis occurring by a driving force from the inner race 43 becomes higher than that of the body 51. However, since the line L1 along which the tapered roller 44 and the raceway surface 53 of the inner race 43 contact each other is positioned on the radially outer side at the smaller end side portion of the roller on the radially outer side, and at the larger end side portion thereof on the radially inner side, the smaller end side portion of the tapered roller 44 is rotated on its own axis at a higher speed, and the larger end side portion thereof at a lower speed. The intersection and crossed axes angle of the contact line L1 of the tapered roller 44 and the raceway surface 53 of the inner race 43 and the cone center line L2 are changeable. Therefore, when the levels of these are suitably set, the factors for causing a fall of the roller to occur and the speed of orbital movement of the roller to become ununiform can be suppressed, and making an optimum adjustment of parts which brings about a smooth rotation of the roller becomes possible.

Fourth Embodiment

Figure 6:
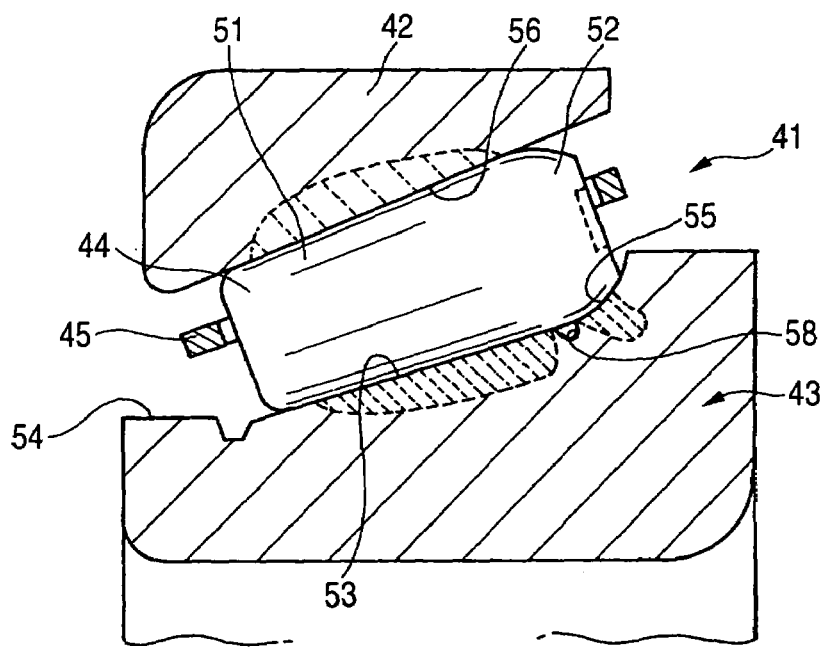
FIG. 6 is a drawing corresponding to FIG. 5 and showing the tapered roller bearing according to a fourth embodiment of the present invention.

FIG. 6 shows the tapered roller bearing 41 according to a fourth embodiment of the present invention. In the inner race 43, the annular groove (recess) 58 for preventing the interference of parts with each other during the manufacturing thereof is formed. The construction of the bearing except this groove is identical with that of the third embodiment shown in FIG. 4, so that the same reference numerals will be added to the parts of the same construction with the description thereof omitted.

According to the tapered roller bearing 41 shown in FIG. 3, an outer race 42 and an inner race 43 are in linear contact with a tapered roller contact so as to have such stress distribution as is shown by hatches of broken lines in the drawing Owing to the annular groove 58 formed in the inner race 43, the stress distribution of this portion thereof is zero but the general stress distribution is substantially identical with that in the embodiment of FIG. 5. When an axial load is further imparted to the bearing in this condition, a convex larger end surface 52 of the tapered roller 44 comes into contact with a larger collar rib surface 55, which has a concave curved surface opposed to the convex surface 52, in the embraced state with respect thereto. Therefore, the axial position of the roller becomes stable, and the roller does not substantially move with respect to a raceway surface 53 of the inner race. As a result, the same stress distribution is maintained. Thus, the occurrence of an edge load can be prevented, and a tapered roller bearing 41 in which a torque loss is reduced greatly can be obtained. Moreover, when an intersection and a crossed axes angle of a contact line L1 of the tapered roller 44 and the raceway surface 53 of the inner race 43 and a cone center line L2 are changed, an optimum adjustment of parts which brings about a smooth rotation of the roller can also be made. The annular groove 58 formed in the inner race 43 can be used as a reservoir for lubricating oil. This enables a tapered roller bearing 41 having an excellent lubricating ability in addition to the effect, which is obtained by supporting the load owing to the continuous stress distribution, of reducing a torque loss to be obtained.

Fifth Embodiment

Figure 7:
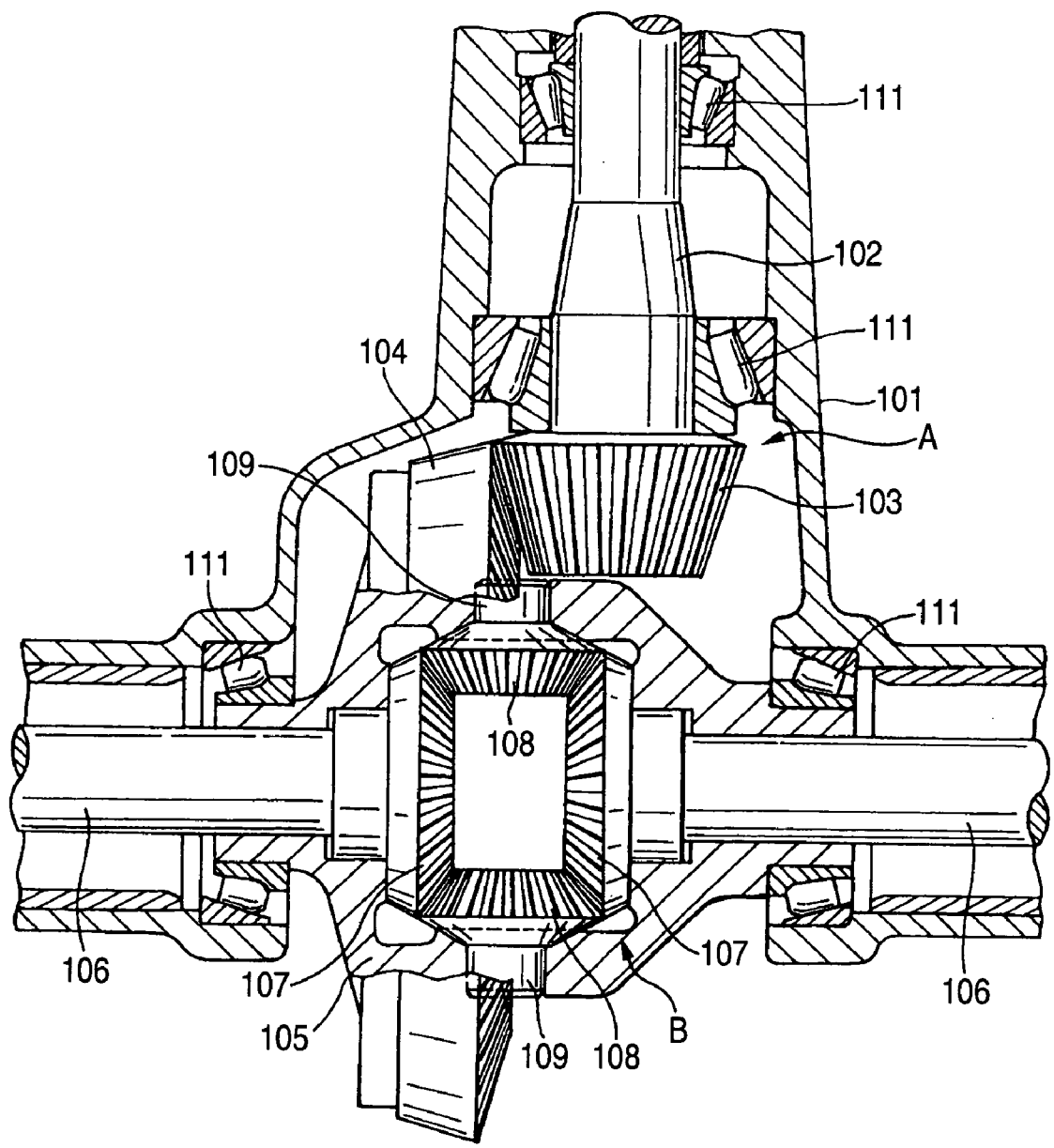
FIG. 7 is a longitudinal sectional view showing the final reduction gear according to a fifth embodiment of the present invention.
Figure 8A:
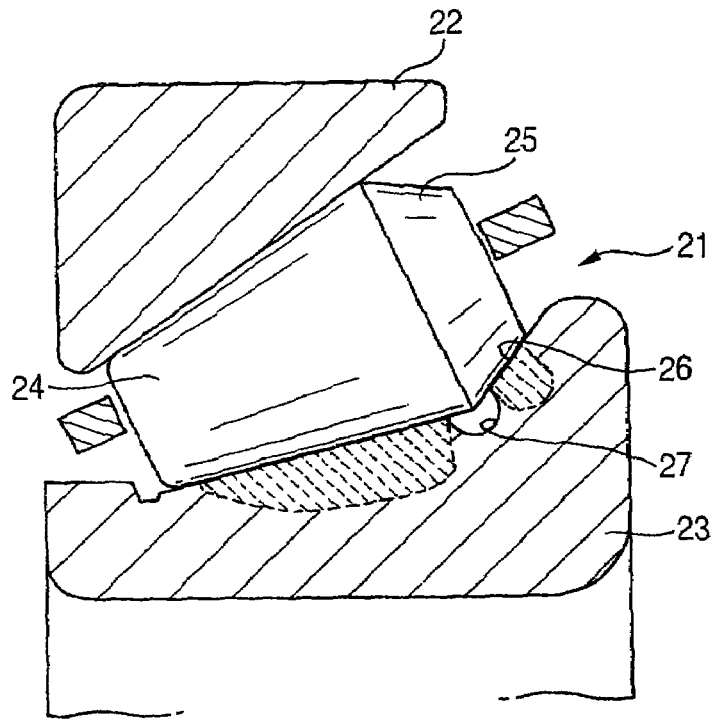
FIG. 8A and 8B are drawings showing the stress distribution of a related art tapered roller bearing.
Figure 8B:
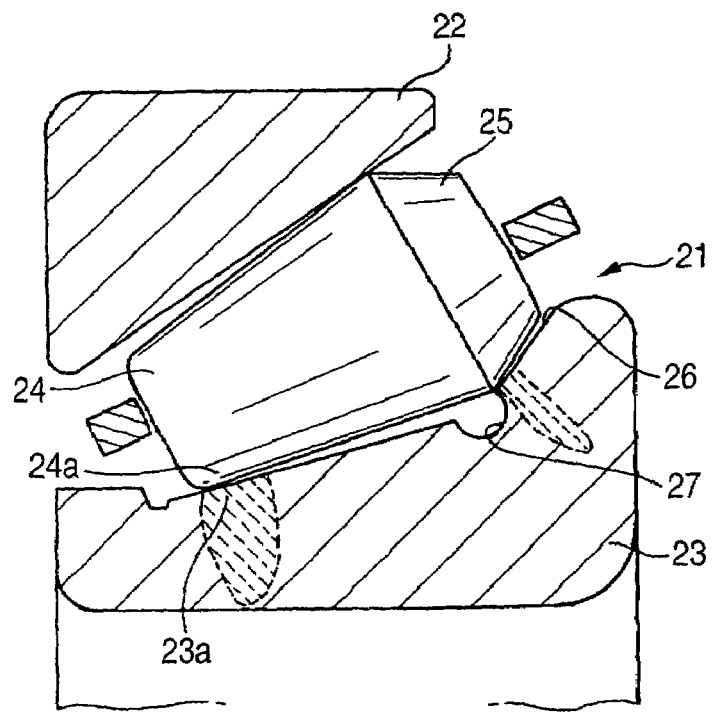

FIG. 7 shows the final reduction gear according to a fifth embodiment of the present invention, and this final reduction gear includes a final gear unit A and a differential gear unit B. Incidentally, an upper portion of FIG. 7 shall indicate a front side, and a lower portion thereof a rear side.

The final gear unit A is provided with a pinion shaft 102 supported rotatably on a differential carrier 101 and mounted at a rear end portion thereof with drive pinion gear 103, a ring gear 104 meshed with the drive pinion gear 103, and a pair of tapered roller bearings 111 supporting the pinion shaft 102 rotatably on the differential carrier 101.

The differential gear unit B is provided with a differential case 105 fixed to the ring gear 104, left and right tapered roller bearings 111 rotatably supporting the differential case 105 rotatably on the differential carrier 101, side gears 107 mounted on inner side end portions of left and right side gear shafts 106 extending from the differential case 105 in the leftward and rightward directions, and differential pinion gears 108 supported rotatably on spiders 109 and meshed with the side gears 107.

In the illustrated embodiment, all pairs of the tapered roller bearings 111 of the final gear unit A and the tapered roller bearings 111 of the differential gear unit B are formed to the same shape.

The tapered roller bearings according to any one of the first to fourth embodiment are used for the tapered roller bearing 111 in this embodiment. As described above, since the tapered roller bearing according to first to fourth embodiment can reduce the torque loss, it becomes possible, by utilizing the above tapered roller bearing to the final gear unit and the differential gear unit, to improve the fuel consumption with maintaining the high rigidity which is one of features of the tapered roller bearing according to the present invention. Further, such a final reduction gear can be obtained that a decrease in lifetime and an increase in the manufacturing cost are improved.

Concerning the four bearings of the final reduction gear shown in FIG. 7, it is unnecessary that all the bearings be made of the roller bearings shown in the first to fourth embodiment. A final reduction gear in which at least one of the four bearings is made of some one of the tapered roller bearings in the first to fourth embodiment with another bearing replaced with a related art tapered roller bearing or a ball bearing also serves the purpose.

What is claimed is:

1. A tapered roller bearing comprising:
   an outer race including an outer raceway surface;
   an inner race including an inner raceway surface and a larger collar surface which is a concave curved surface; and
   tapered rollers provided between the outer and inner races, each of the tapered rollers including a tapered surface and a larger end surface which is a convex curved surface communicating with the tapered surface and which corresponds to the larger collar surface, wherein the larger end surface smoothly connects with the tapered surface, wherein the cone centers of each of the tapered rollers are offset from the bearing axis toward the corresponding tapered roller.

2. The tapered roller bearing according to claim 1, wherein the convex curved surface includes a spherical surface.

3. The tapered roller bearing according to claim 1, wherein the larger collar surface is connected to the inner raceway surface.

4. A tapered roller bearing comprising:
   an outer race including an outer raceway surface;
   an inner race including an inner raceway surface and a larger collar surface which is a concave curved surface; and
   tapered rollers provided between the outer and inner races, each of the tapered rollers including a tapered surface and a larger end surface which is a convex curved surface communicating with the tapered surface and which corresponds to the larger collar surface, wherein the larger end surface smoothly connects with the tapered surface, wherein a recess is formed in a boundary portion between the larger collar surface and the inner raceway surface.

5. The tapered roller bearing according to claim 4, wherein the convex curved surface includes a spherical surface.

6. The tapered roller bearing according to claim 4, wherein the larger collar surface is connected to the inner raceway surface.

7. A final reduction gear comprising:
   a final gear unit for transmitting a driving torque from an engine including a pinion shaft, one end of which is provided with a pinion gear, and a pair of roller bearings supporting the pinion shaft rotatably on a differential carrier; and
   a differential gear unit including a ring gear meshed with the pinion gear, a differential case provided to the ring gear and a pair of roller bearings rotatably supporting the differential case,
   wherein at least one of the roller bearings includes:
     an outer race including an outer raceway surface;
     an inner race including an inner raceway surface and a larger collar surface which is a concave curved surface; and
     tapered rollers provided between the outer and inner races, each of the tapered rollers including a tapered surface and a larger end surface which is a convex curved surface communicating with the tapered surface and which corresponds to the larger collar surface, wherein the larger end surface smoothly connects to said tapered surface, wherein the cone centers of each of the tapered rollers are offset from the corresponding roller bearing axis toward the corresponding tapered roller.

8. The final reduction gear according to claim 7, wherein the convex curved surface includes a spherical surface.

9. The final reduction gear according to claim 7, wherein the larger collar surface is connected to the inner raceway surface.

10. A final reduction gear comprising:
- a final gear unit for transmitting a driving torque from an engine including a pinion shaft, one end of which is provided with a pinion gear, and a pair of roller bearings supporting the pinion shaft rotatably on a differential carrier; and
- a differential gear unit including a ring gear meshed with the pinion gear, a differential case provided to the ring gear and a pair of roller bearings rotatably supporting the differential case,
- wherein at least one of the roller bearings includes:
  an outer race including an outer raceway surface;
  an inner race including an inner raceway surface and a larger collar surface which is a concave curved surface; and
  tapered rollers provided between the outer and inner races, each of the tapered rollers including a tapered surface and a larger end surface which is a convex curved surface communicating with the tapered surface and which corresponds to the larger collar surface, wherein the larger end surface smoothly connects to said tapered surface, wherein a recess is formed in a boundary portion between the larger collar surface and the inner raceway surface.

11. The final reduction gear according to claim 10, wherein the convex curved surface includes a spherical surface.

12. The final reduction gear according to claim 10, wherein the larger collar surface is connected to the inner raceway surface.

* * * * *